(12) United States Patent
Kobayashi et al.

(10) Patent No.: US 6,614,194 B2
(45) Date of Patent: Sep. 2, 2003

(54) MOTOR FAN CONTROL APPARATUS

(75) Inventors: Toshimi Kobayashi, Fujisawa (JP); Akihiro Koike, Sagamihara (JP); Hironori Saito, Yokohama (JP); Ayumu Kubota, Machida (JP)

(73) Assignee: Nissan Motor Co., Ltd., Kanagawa (JP)

( * ) Notice: Subject to any disclaimer, the term of this patent is extended or adjusted under 35 U.S.C. 154(b) by 69 days.

(21) Appl. No.: 10/036,481

(22) Filed: Jan. 7, 2002

(65) Prior Publication Data
US 2002/0093299 A1 Jul. 18, 2002

(30) Foreign Application Priority Data

Jan. 9, 2001 (JP) .......................................... 2001-001815
Nov. 13, 2001 (JP) .......................................... 2001-347649

(51) Int. Cl.⁷ .............................. H02P 7/68; B60R 27/00
(52) U.S. Cl. ........................................ 318/111; 318/245
(58) Field of Search ................................ 318/111, 112, 318/113, 244, 245, 772, 773

(56) References Cited

U.S. PATENT DOCUMENTS

| 4,404,485 A | * | 9/1983 | Ban et al. ..................... 310/198 |
| 4,532,458 A | * | 7/1985 | Kuznetsov et al. ......... 318/111 |
| 5,216,339 A | * | 6/1993 | Skybyk ....................... 318/254 |
| 5,670,837 A | * | 9/1997 | Boutaghou et al. ......... 310/184 |
| 5,757,154 A | * | 5/1998 | Peot ............................ 318/381 |

* cited by examiner

*Primary Examiner*—Bentsu Ro
(74) *Attorney, Agent, or Firm*—McDermott, Will & Emery

(57) ABSTRACT

Two motor fans are driven by two 4-pole direct current motors, respectively. Rotational speed of the two motors is controlled in three stages, namely low speed, intermediate speed and high speed. Specifically, at the time of low speed operation the two motors are connected in series with four poles, at the time of intermediate speed operation the two motors are connected in parallel with three poles, and at the time of high speed operation the two motors are connected in parallel with four poles.

22 Claims, 15 Drawing Sheets

(VEHICLE BODY ~ BATTERY NEGATIVE ELECTRODE)

(VEHICLE BODY ~ BATTERY NEGATIVE ELECTRODE)

— HIGH SPEED OPERATION —

(VEHICLE BODY ~ BATTERY NEGATIVE ELECTRODE)

(VEHICLE BODY ~ BATTERY NEGATIVE ELECTRODE)

— LOW SPEED OPERATION —

— INTERMEDIATE SPEED OPERATION —

— HIGH SPEED OPERATION —

— LOW SPEED OPERATION —

— INTERMEDIATE SPEED OPERATION —

— HIGH SPEED OPERATION —

(VEHICLE BODY ~ BATTERY NEGATIVE ELECTRODE)

(VEHICLE BODY ~ BATTERY NEGATIVE ELECTRODE)

MOTOR FAN CONTROL APPARATUS

BACKGROUND OF THE INVENTION

1. Field of the Invention

The present invention relates to a control apparatus for driving a fan with electric motors.

2. Description of the Related Art

A motor fan control apparatus for controlling the rotational speed of a motor fan for blasting air onto a radiator for carrying out heat exchange for engine cooling water and a condenser for carrying out heat exchange for coolant in an air conditioner has been known. The radiator and condenser are mounted at the front of a vehicle. With this sort of control apparatus, the rotational speed of the motor fan is controlled based on engine cooling water temperature, an air conditioner running state/stopped state, air conditioner coolant pressure, and vehicle speed etc.

FIG. 14 is a circuit diagram of a conventional pole-changing type motor fan control apparatus. With this conventional control apparatus, a radiator and condenser are cooled by cooling air generated by fans respectively attached to two 4-pole direct current motors. The number of drive poles of the two 4-pole direct current motors 1 and 2 is switched between two poles and four poles by two relays 3 and 4, and rotational speed is controlled in two stages, namely low speed and high speed. The 4-pole direct motors 1 and 2 are respectively provided with two armature winding terminals (hereafter simply called terminals) P1 and P2 for connecting to positive pole brushes, and two armature winding terminals (hereafter simply called terminals) N1 and N2 for connecting to negative pole brushes.

Also, in FIG. 14, the relays 3 and 4 are turned on (coil energized) or off (coil not energized) by a controller 11 to switch the number of drive poles of the motors 1 and 2. Voltage is supplied from a battery (B) 12 through fuses 13 and 14 and the relays 3 and 4 to the motors 1 and 2. Voltage is supplied from an ignition power source (IG) 15 through a fuse 16 to the coils of the relays 3 and 4. The ignition power source 15 is a power source which is effective as long as an ignition switch (not shown) is set at an ON or START position.

At the time of low speed operation, the direct current motors 1 and 2 are both driven by two poles. That is, only relay 3 is turned on by the controller 11, the battery power source 12 is only applied to the terminal P1 of the two motors 1 and 2, and current flows from the each terminal P1 of the motors 1 and 2 to the each terminal N1 of the motors 1 and 2. On the other hand, at the time of high speed operation, the direct current motors 1 and 2 are both driven with four poles. That is, the relays 3 and 4 are both turned on by the controller 11, the battery power source 12 is simultaneously applied to both terminals P1 and P2 of the two motors 1 and 2, and current respectively flows from the each terminal P1 of the motors 1 and 2 to each terminal N1 of the motors 1 and 2, and also from the each terminal P2 to the terminal N2 of the motors 1 and 2.

FIG. 15 is a circuit diagram of a conventional serial-parallel switching type motor fan control apparatus. With this conventional device, a radiator and a condenser are cooled by cooling air generated by fans respectively attached to two 4-pole direct current motors. The connection of the two 4-pole direct current motors is switched between serial and parallel by three relays 5–7, and rotational speed is controlled in two stages, namely low speed and high speed. In FIG. 15, parts that are the same as those in FIG. 6 have the same reference numerals assigned thereto, and it's description is omitted. Also, with this serial parallel switching system, + side terminals P1 and P2 of the 4-pole direct currents motors 1 and 2 are connected, and – side terminals N1 and N2 are connected.

At the time of low speed operation, the direct current motors 1 and 2 are connected in series with four poles. That is, if only the relay 5 is turned on by the controller 11, the battery power source 12 is applied to the terminals P1 and P2 of the motor 1, and current flows from terminals P1 and P2 of the motor 1 to the terminals N1 and N2 of the motor 1. Current flowing from the terminals N1 and N2 of the motor 1 then flows through the relay 6 and from the terminals P1 and P2 of the motor 2 to the terminals N1 and N2 of the motor 2. On the other hand, at the time of high speed operation, the direct current motors 1 and 2 are connected in parallel with four poles. That is, if the relays 5–7 are all turned on by the controller 11, the battery power source 12 is applied simultaneously to the terminals P1 and P2 of the motor 1 and to the terminals P1 and P2 of the motor 2, and current flows from the terminals P1 and P2 of the motor 1 to the terminals N1 and N2, and also from the terminals P1 and P2 of motor 2 to the terminals N1 and N2.

SUMMARY OF THE INVENTION

With the above-described pole changing type rotational speed control apparatus, the number of relays is small, so the circuit cost is low. However, at the time of low speed operation, motor efficiency becomes low, since the motor needs to be driven with two poles, and there is a problem that the useful life of the brushes becomes short due to high electrical load.

On the other hand, with the above described serial-parallel switching type rotational speed controller, at both low speed and high speed the motor is driven by four poles, and so the useful life of the motor becomes prolonged. However, since the rotational speed is low at the time of low speed operation, it is often used in high speed operation, and there is a problem that there is a lot of fan noise.

Also, with both types of motor fan controller, since it is not possible to control rotational in two stages for low speed operation and high speed operation, it is often used in high speed operation, and there is a problem that the electrical power consumption and the noise are considerable.

The object of the present invention is to make it possible to reduce an electrical power consumption of a fan motor and amount of noise of a motor fan, and to increase the useful life of the fan motor.

In order to attain the above-noted object, a control apparatus for two N-pole direct current motors receiving power from a single power source, for respectively driving two motor fans, comprises: a switching device that switches between a motor serial connection state where the two motors are connected in series and a motor parallel connection state where the two motors are connected in parallel, and switches a number of drive poles of the two motors, and a controller that controls said switching device so that rotational speed of the two motors is controlled in multiple stages by switching the number of drive poles of the two motors and switches the serial or parallel connection states of the two motors.

The N-pole direct current motor can be a 4-pole direct current motor or 3-pole direct current motor.

DESCRIPTION OF THE PREFERRED EMBODIMENT

First Embodiment

Figure 1:
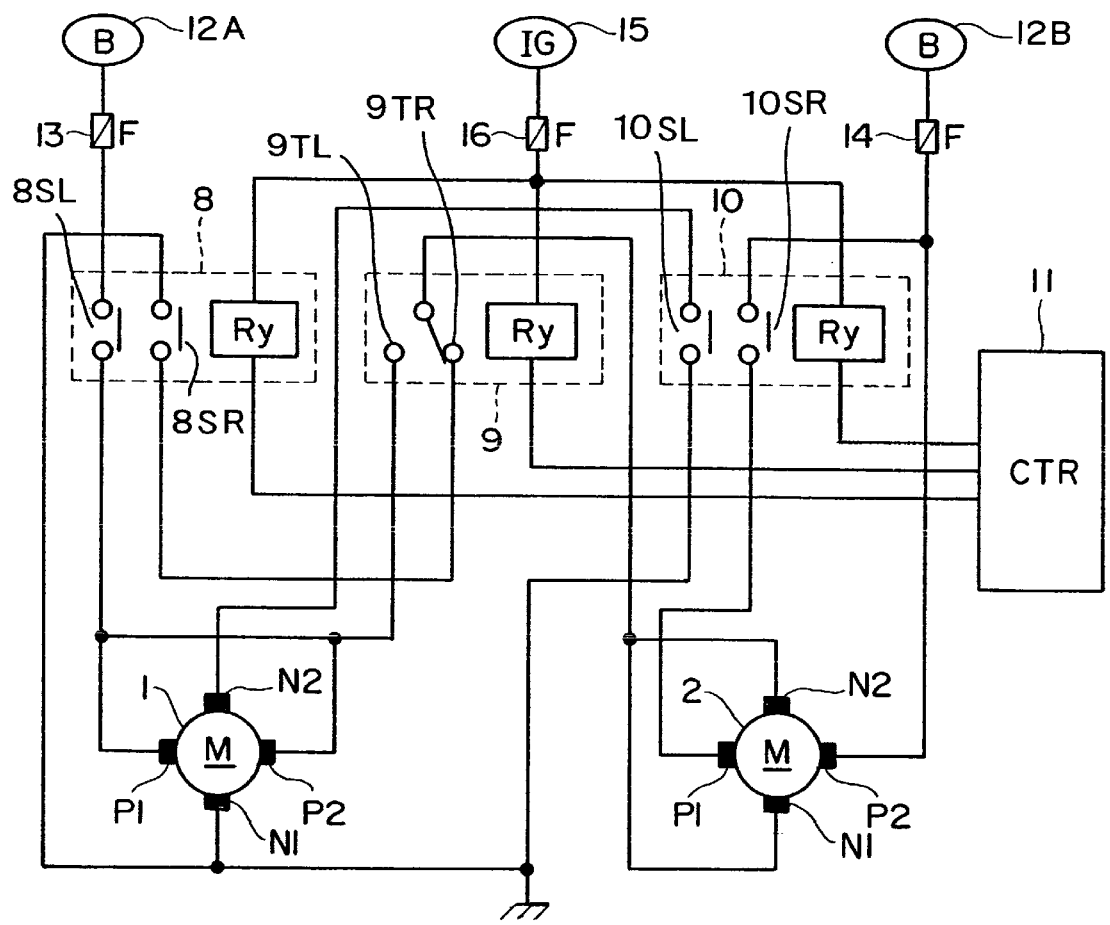
FIG. 1 is a drawing showing the first embodiment of a motor fan control apparatus according to the present invention.
Figure 14:
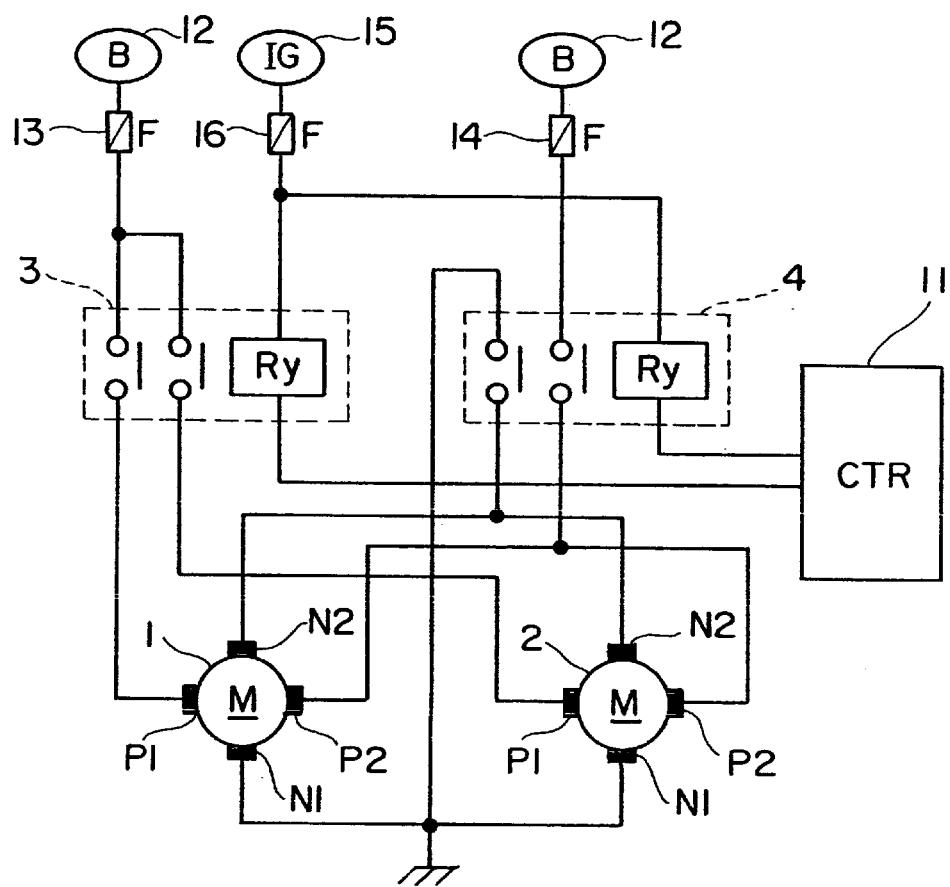
FIG. 14 is a drawing showing a conventional pole-changing type motor fan control apparatus.
Figure 15:
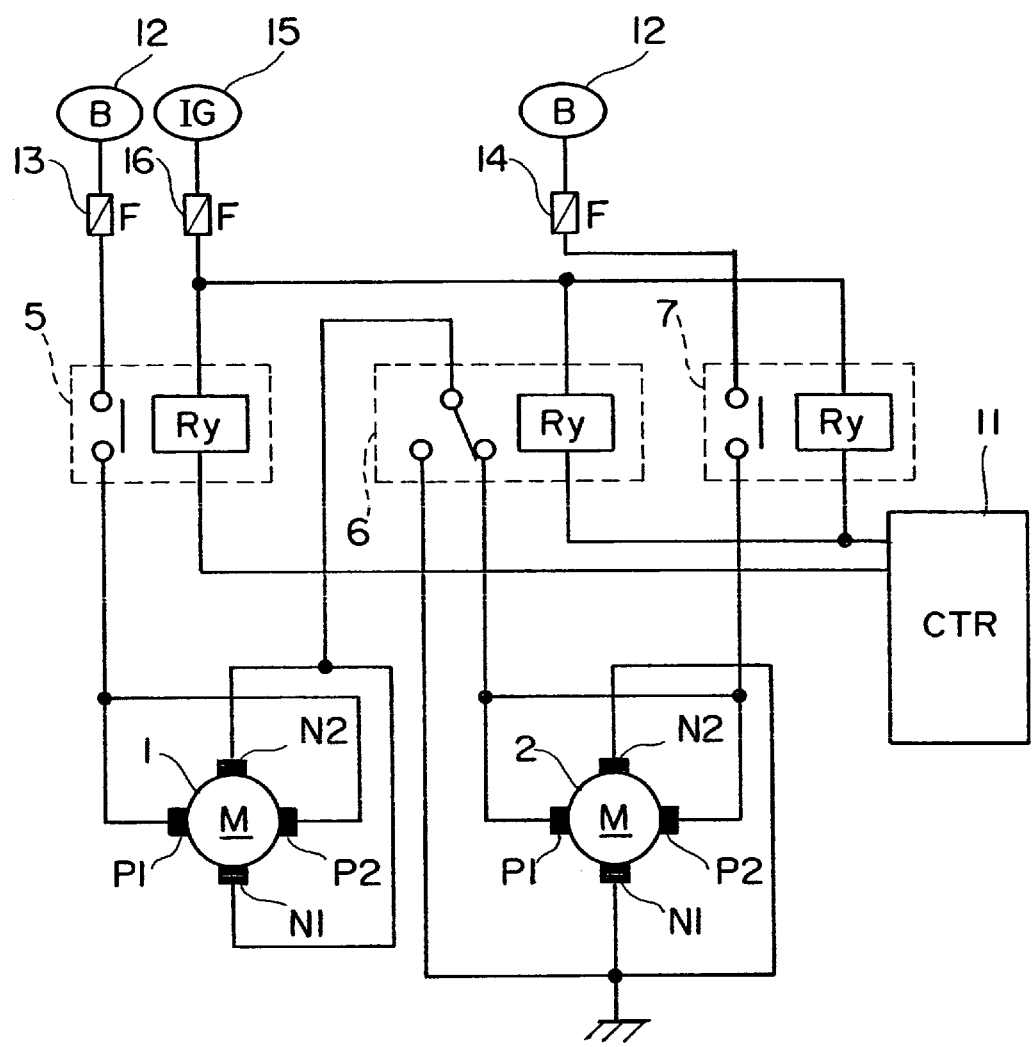
FIG. 15 is a drawing showing a conventional series-parallel switching type motor fan control apparatus.

FIG. 1 is a drawing showing the first embodiment of a motor fan control apparatus according to the present invention. With this motor fan control apparatus, a radiator and a condenser are cooled by cooling air generated by fans respectively attached to two 4-pole direct current motors. Parts that are the same as those in FIG. 14 and FIG. 15 will be described using the same reference numerals. With this motor fan control apparatus, the number of drive poles of the two 4-pole motors 1 and 2 is switched between four poles and three poles and between a serial connection and a parallel connection are switched by the three relays 8–10. In this way, rotational speed is controlled in three stages, namely for low speed, medium speed and high speed. FIG. 1 shows all of the relays 8–10 in the OFF state.

The motor fan control apparatus of the present invention is applied to a vehicle that has a cooling system in which a radiator and a condenser are cooled using fans driven by motors. Throughout this specification, a fan driven by a motor will be referred to as a motor fan. There are systems for cooling engine cooling water in a radiator and air conditioner coolant using fans driven directly by an engine via a coupling. The motor fan of the present invention is different from such a type of fan that is driven by an engine.

In FIG. 1, the 4-pole direct motors 1 and 2 are respectively provided with two armature winding terminals (hereafter simply called terminals) P1 and P2 connecting to positive pole brushes, and two armature winding terminals (hereafter simply called terminals) N1 and N2 connecting to negative pole brushes. The + pole side terminals P1 and P2 of one of the motors 1 and 2 are connected, and − pole side terminals N1 and N2 of the other motor 2 are connected.

The relays 8 and 10 have two a-contacts, in other words two normally open contacts. The relay 9 has one c-contact, in other words one common contact. The relay 8 has normally open relay switches 8SL and 8SR. If the relay 8 is on, the relay switches 8SL and 8SR are closed. The relay 10 has normally open relay switches 10SL and 10SR. If the relay 10 is on, the relay switches 10SL and 10SR are closed. The relay 9 has a terminal 9TL that is normally closed, and a terminal 9TR that is normally open. If the relay 9 is on, the terminal 9TL is open, and the terminal 9TR is closed.

The controller 11 turns the relays 8–10 ON and OFF, thus switching the number of drive poles of the motors 1 and 2, and switching between the serial-connection and parallel connection of the motors 1 and 2. Voltage is supplied from a battery (B) 12 (referred to as 12A and 12B in FIGS. 1–4 for the sake of convenience) through fuses 13 and 14 and the relays 8 and 10 to the motors 1 and 2. Power is supplied from an ignition power source (IG) 15 through a fuse 16 to the coils of the relays 8–10. The ignition power source 15 is a power source which is effective as long as an ignition switch (not shown) is set at an ON or START position.

A description will now be given of the motor fan control apparatus having the above described structure referring to FIG. 2 for low speed operation, FIG. 3 for intermediate speed operation, and FIG. 4 for high speed operation.

Low Speed Operation

Figure 2:
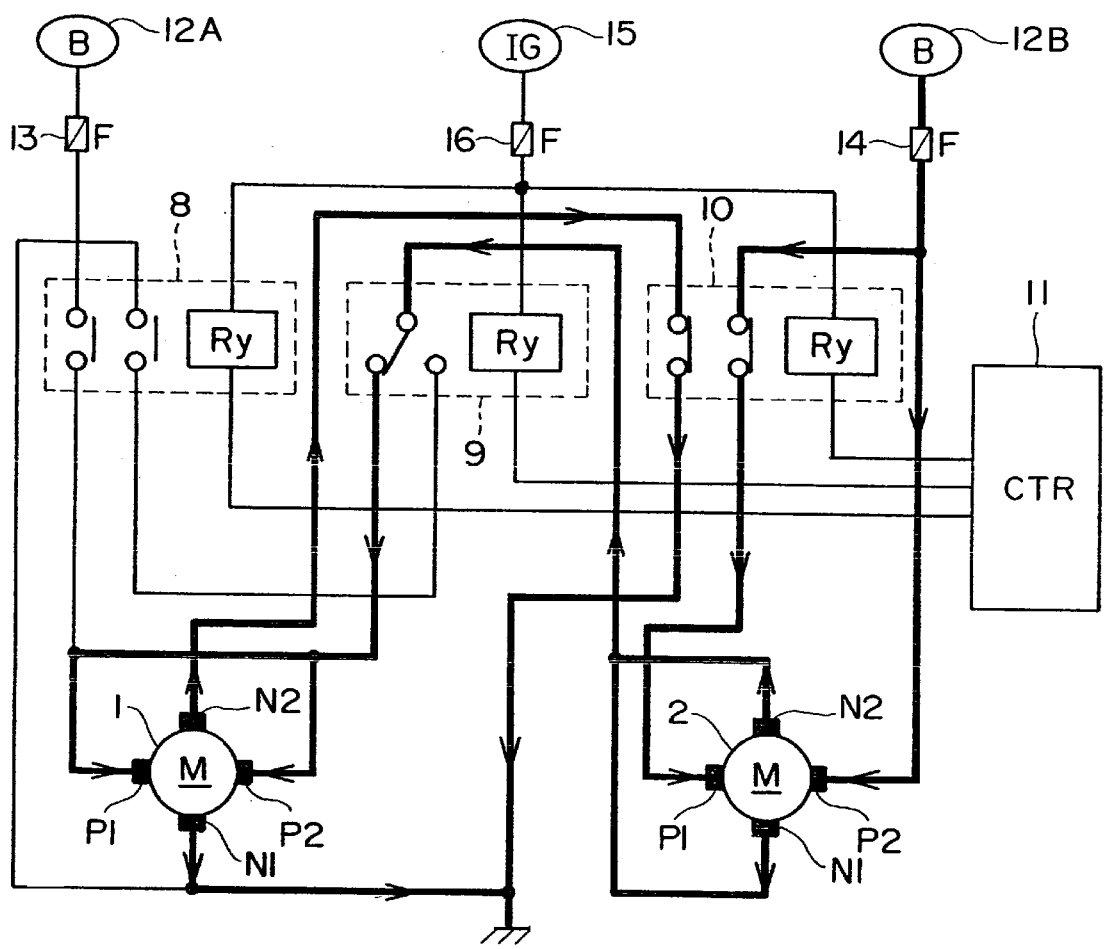
FIG. 2 is a drawing showing current flow at the time of low speed operation, for the motor fan control apparatus shown in FIG. 1.

At the time of low speed operation, as shown in FIG. 2, turning the relays 9 and 10 ON by the controller 11 causes the motors 1 and 2 to be connected in series with four poles. Specifically, the battery power source 12B is connected to the terminals P1 and P2 of the motor 2, the terminals N1 and N2 of the motor 2 are connected to the terminals P1 and P2 of the motor 1, and the terminals N1 and N2 of the motor 1 are grounded to the vehicle body connected to the negative electrode of the battery power source 12. With this circuitry connection as shown in FIG. 2, the motors 1 and 2 are connected in series with four poles, and current flows from the battery power source 12B to the motor 1 through the motor 2. In FIG. 2, bold line indicates current flow at Low rotational speed operation.

Intermediate Speed Operation

Figure 3:
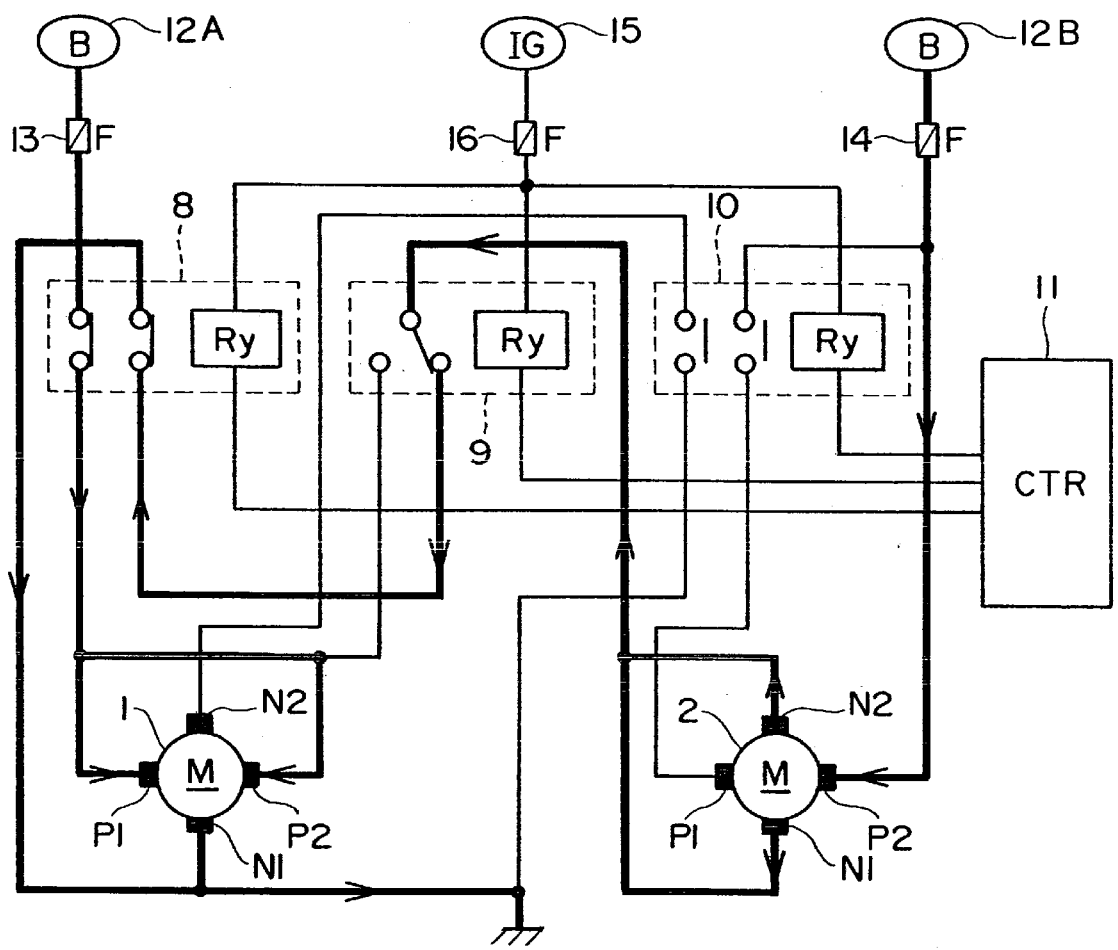
FIG. 3 is a drawing showing current flow at the time of medium speed operation, for the motor fan control apparatus shown in FIG. 1.

At the time of intermediate speed operation, as shown in FIG. 3, as a result of the controller 11 turning on only the relay 8, the motors 1 and 2 are connected with two poles in parallel. Specifically, the battery power sources 12A is connected to the terminals P1 and P2 of the motor 1, and the terminals N1 and N1 of the motor 2 are earthed to the vehicle body connected to the negative electrodes of the battery power sources 12. The terminal N1 of the motor 1 is normally connected to the vehicle body. Therefore, at the motor 1, current flows from the terminals P1 and P2 to the terminal N1, and the motor 1 is driven with three poles. On the other hand, at the motor 1, since the terminal P2 is normally connected to the battery power source 12B, current flows from the terminal P2 to the terminals N1 and N2, and the motor 2 is driven with three poles. In FIG. 3, bold line indicates current flow at Intermediate rotational speed operation.

High Speed Operation

Figure 4:
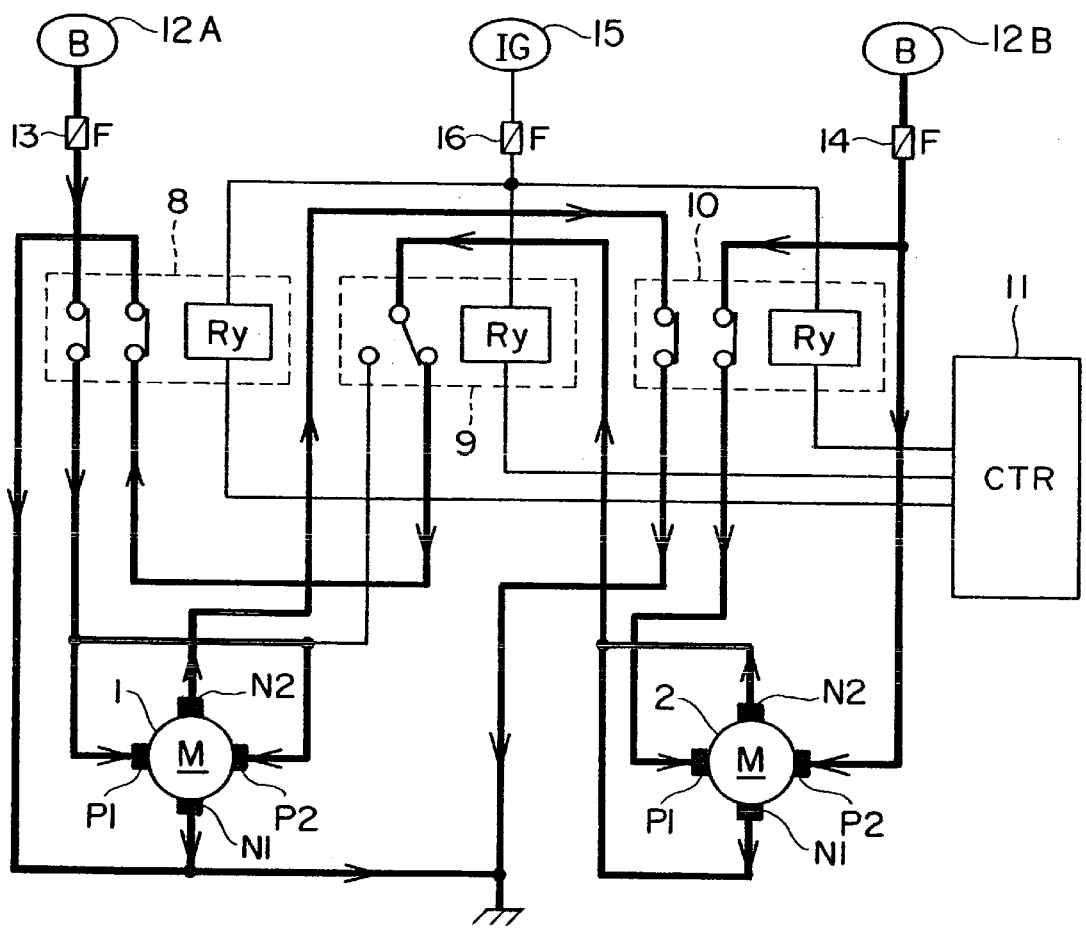
FIG. 4 is a drawing showing current flow at the time of high speed operation, for the motor fan control apparatus shown in FIG. 1.

At the time of high speed operation, as shown in FIG. 4, as a result of the controller 11 turning on the relays 8 and 10, the motors 1 and 2 are connected with four poles in parallel. Specifically, the battery power sources 12A and 12B are respectively connected to the terminals P1 and P2 of the motors 1 and 2, and the terminals N1 and N2 of the motor 1 and the terminals N1 and N2 of the motor 2 are earthed to the vehicle body connected to the negative electrode of the battery power source 12. In this way, with the motors 1 and 2 as shown in FIG. 4, at each motors 1 and 2, current flows from the terminals P1 and P2 of both motors to the terminals N1 and N2, and the motors 1 and 2 are both driven in parallel with four poles. In FIG. 4, bold line indicates current flow at Low rotational speed operation.

In short, a motor fan control apparatus of the first embodiment according to the present invention, in which electrical power is supplied from a single battery source 12 to two 4-pole direct current motors 1 and 2, and two fans are respectively driven by the two motors 1 and 2, has the following structure. Of the two motors 1 and 2, one motor 1 has two + side armature winding terminals P1 and P2 connected together. Two – side armature winding terminals N1 and N2 of the other motor 2 are connected together. The rotational speed of the two motors is controlled in three stages in conformance with switching between the series connected state and the parallel connected state of the two motors 1 and 2 as well as switching the number of drive poles of the two motors 1 and 2. More specifically, at the time of low speed operation, the two motors 1 and 2 are connected in series with four poles, at the time of intermediate speed mode, the two motors 1 and 2 are connected in parallel with three poles. At the time of high speed operation, the two motors 1 and 2 are connected in parallel with four poles.

With a motor fan control apparatus adopting this type of structure, the control circuitry can be implemented with a smaller number of relays, and the cost of the apparatus can be suppressed. Also, since the rotational speed of the two motors 1 and 2 is controlled in three stages, namely low speed operation with fourpole series drive and high speed operation with four pole parallel drive, as well as intermediate speed operation with three pole parallel drive, the following advantages are realized. Two pole drive is used less frequently, and the overall operating efficiency of the motor is improved. As well as being able to reduce the power consumption, it is possible to prolong the useful life of the brushes. High speed operation is used less frequently, and it is possible to reduce the overall amount of fan noise.

With the motor fan control apparatus of the above-described first embodiment, one motor 1, of the two 4-pole direct current motors 1 and 2, has + pole side terminals P1 and P2 connected to each other, while the other motor 2 has — pole side terminals N1 and N2 connected to each other. However, as shown in FIG. 5, even if the — pole side terminals N1 and N2 of each of the two motors 1 and 2 are connected to each other, it is possible to control the rotational speed of the motor fan in three stages by switching the number of drive poles and the series/parallel connection.

Figure 5:
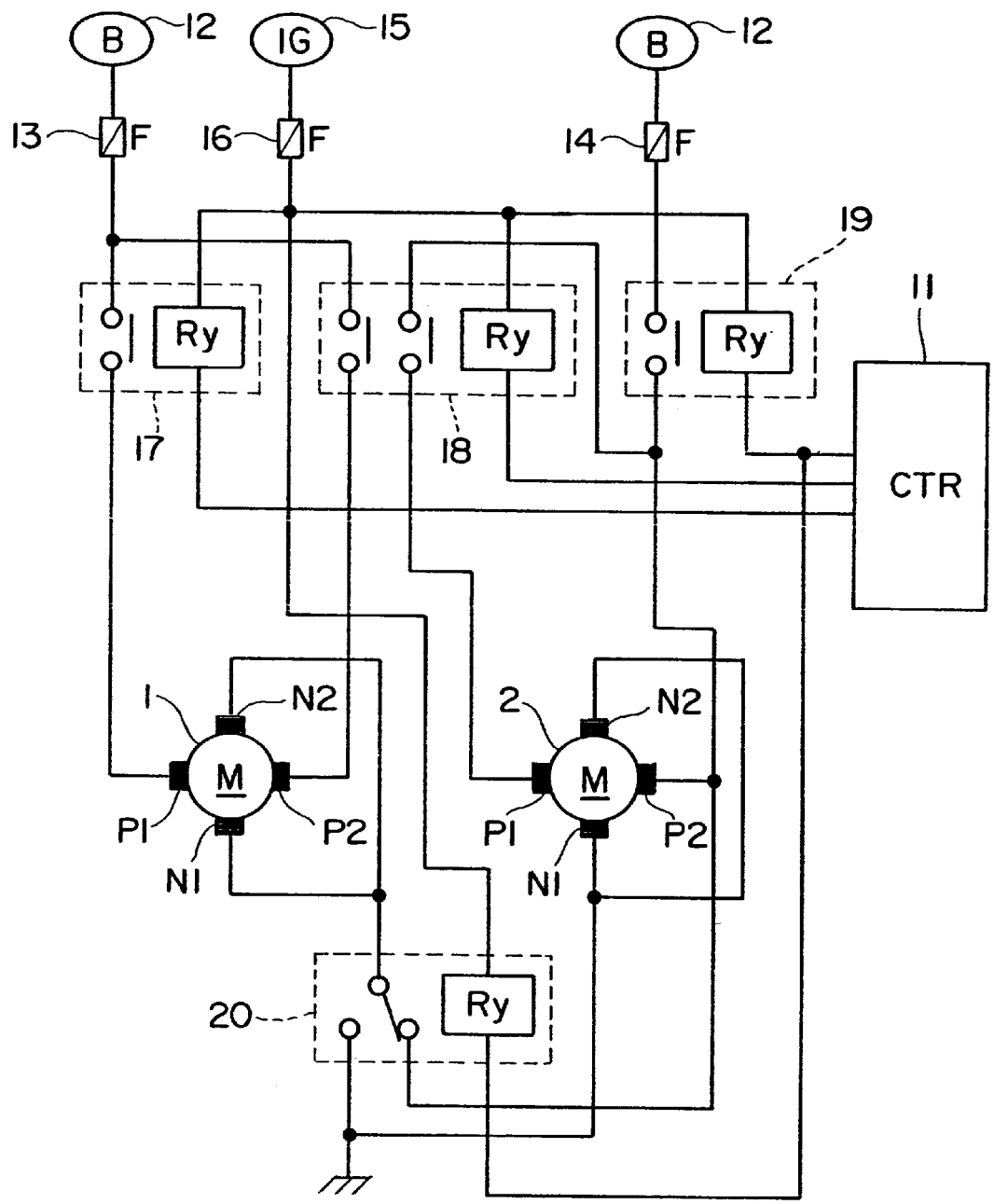
FIG. 5 is a drawing showing another embodiment of a motor fan control apparatus according to the present invention.

In FIG. 5, the same reference numerals are assigned to the parts that are the same as parts shown in FIG. 1 and explanation will be made mainly on difference therebetween. With this motor fan controller, four relays 17–20 are switched by the controller 11, and the number of drive poles of the motors 1 and 2 and the serial or parallel connection are switched. Namely, if the relays 17 and 18 are turned on, the motors 1 and 2 are connected in series with four poles so that low speed operation is performed. Also, if the relays 17, 19 and 20 are turned on, the motors 1 and 2 are connected in parallel with three poles so that intermediate speed operation is performed. If all of the relays 17–20 are turned on, the motors 1 and 2 are connected in parallel with four poles so that high speed operation is performed.

The motor fan control apparatus shown in FIG. 5 and the control circuit of the first embodiment shown in FIG. 1 will now be compared. The motor fan control apparatus of the first embodiment shown in FIG. 1 uses three relays 8–10. On the other hand, the control circuit shown in FIG. 5 uses four relays 17–20. The cost of the motor fan control apparatus of FIG. 1 is cheap compared to the motor fan control apparatus of FIG. 5.

Although not shown in the drawings, if the two 4-pole direct current motors are provided with + pole side terminals P1 and P2 connected to each other, rotational speed of the motor fan can be controlled in three stages by switching the number of drive poles and series/parallel connection. In this case, four relays are also required to change motor fan rotational speed I three stage.

It is also possible to carry out switching of the number of drive poles and series/parallel connection by switching all terminal connections using relays, without connecting the + pole- side terminals P1 and P2 and – pole side terminals N1 and N2 of the two 4-pole direct current motors. In this case, at least four relays are required. As compared to this control apparatus, there is the advantage that the cost of the control apparatus in the above-described embodiment can be reduced.

Second Embodiment

In the motor fan control apparatus of the above noted first embodiment, electrical power is supplied from a single battery source to two 4-pole direct current motors and two fans are respectively driven by the two motors at individual Low/Medium/High rotational speed operations. Individual Low/Medium/High rotational speed operations is implemented with the following electric connection. Of the two motors, one motor has two + side armature winding terminals connected together. Two – side armature winding terminals of the other motor are connected together. At the time of low speed operation, the two motors are connected in series with four poles, at the time of intermediate speed mode, the two motors are connected in parallel with three poles, and at the time of high speed operation, the two motors are connected in parallel with four poles.

On the other hand, with the second embodiment, at the time of low speed operation, two motors are connected in series with three poles, at the time of intermediate speed mode, two motors are connected in parallel with three poles, and at the time of high speed operation, two motors are connected in parallel with four poles.

Figure 6:
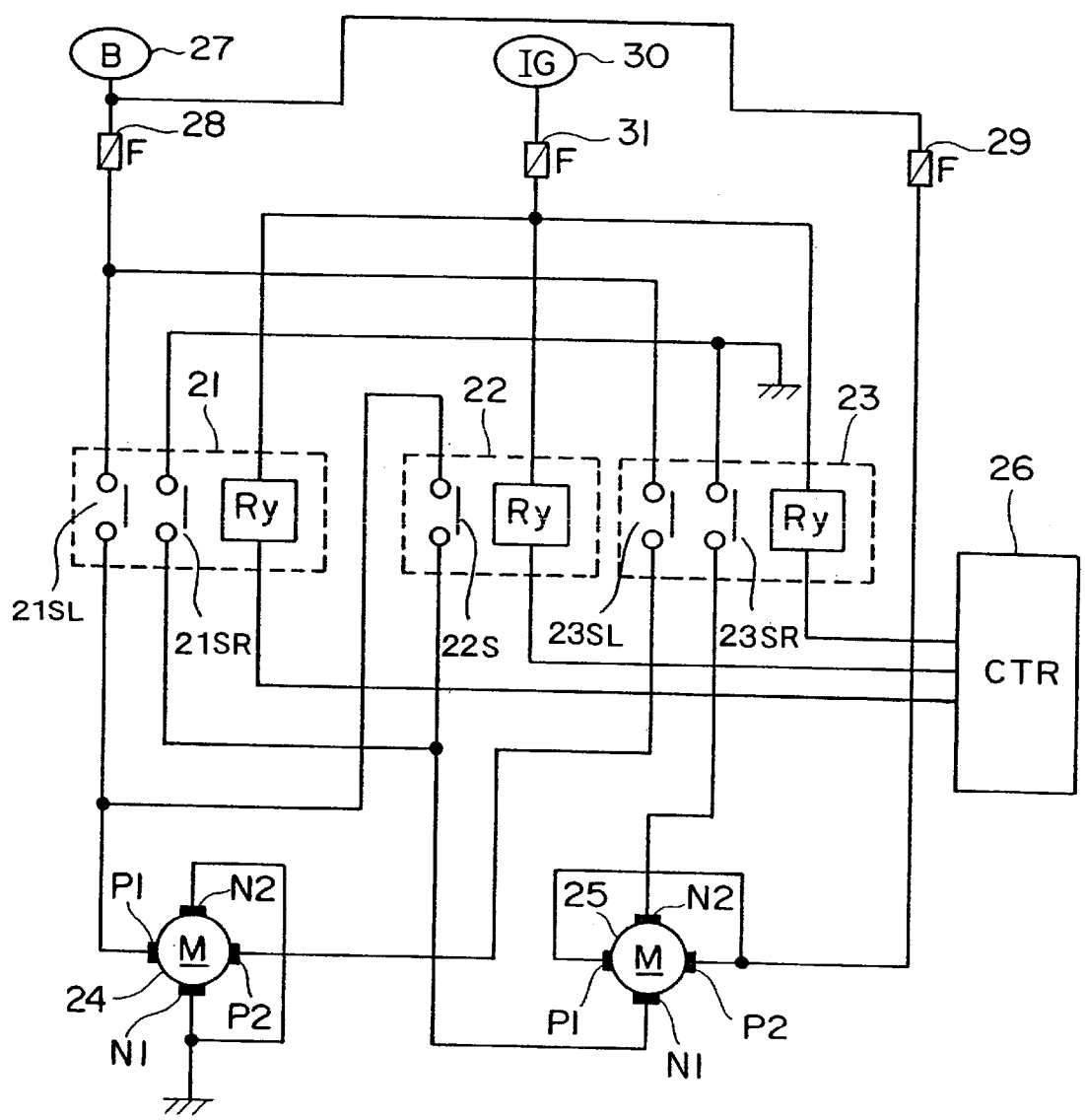
FIG. 6 is a drawing showing the second embodiment of a motor fan control apparatus according to the present invention.

FIG. 6 is a drawing showing the second embodiment of a motor fan control apparatus according to the present invention. With this motor fan control apparatus, a radiator and a condenser are cooled by cooling air generated from fans that are respectively driven two 4-pole direct current motors. In the motor fan control apparatus according to the second embodiment, rotational speed is controlled in three stages which are low speed operation, medium speed operation and high speed operation. In order to carry out rotational speed control, three relays 21–23 are operated so that the number of drive poles of the two 4-pole motors 24 and 25 is switched between four poles and three poles as well as between serial and parallel connections. It is to be noted that FIG. 6 shows all of the relays 21–23 in the OFF state.

In FIG. 6, the 4-pole direct motors 24 and 25 are respectively provided with two armature winding terminals (hereafter simply called terminals) P1 and P2 connecting to positive pole brushes, and two armature winding terminals (hereafter simply called terminals) N1 and N2 connecting to negative pole brushes. The + pole side terminals P1 and P2 of the motor 25 are connected to each other, and — pole side terminals N1 and N2 of the other motor 24 are connected to each other.

The relays 21 and 23 have two a-contacts 21SL,SR and 23SL,SR and the relay 22 has one a-contact 22S. An a-contact is referred as a normally open contact. The controller 26 turns the relays 21–23 ON and OFF to switch the number of drive poles of the motors 24 and 25 and switch between serial and parallel connections of the motors 24 and 25. Voltage is supplied from a battery (B) 27 through fuses 28 and 29 and the contacts of the relays 21–23. Power is supplied from an ignition source (IG) 15 through a fuse 31 to the coils of the relays 21–23. The ignition power source 15 is a power source which is effective as long as an ignition switch (not shown) is set at an ON or START position.

A description will now be given of the motor fan control apparatus according to the second embodiment referring to FIG. 7 for low speed operation, FIG. 8 for intermediate speed operation, and FIG. 9 for high speed operation.

Low Speed Operation

Figure 7:
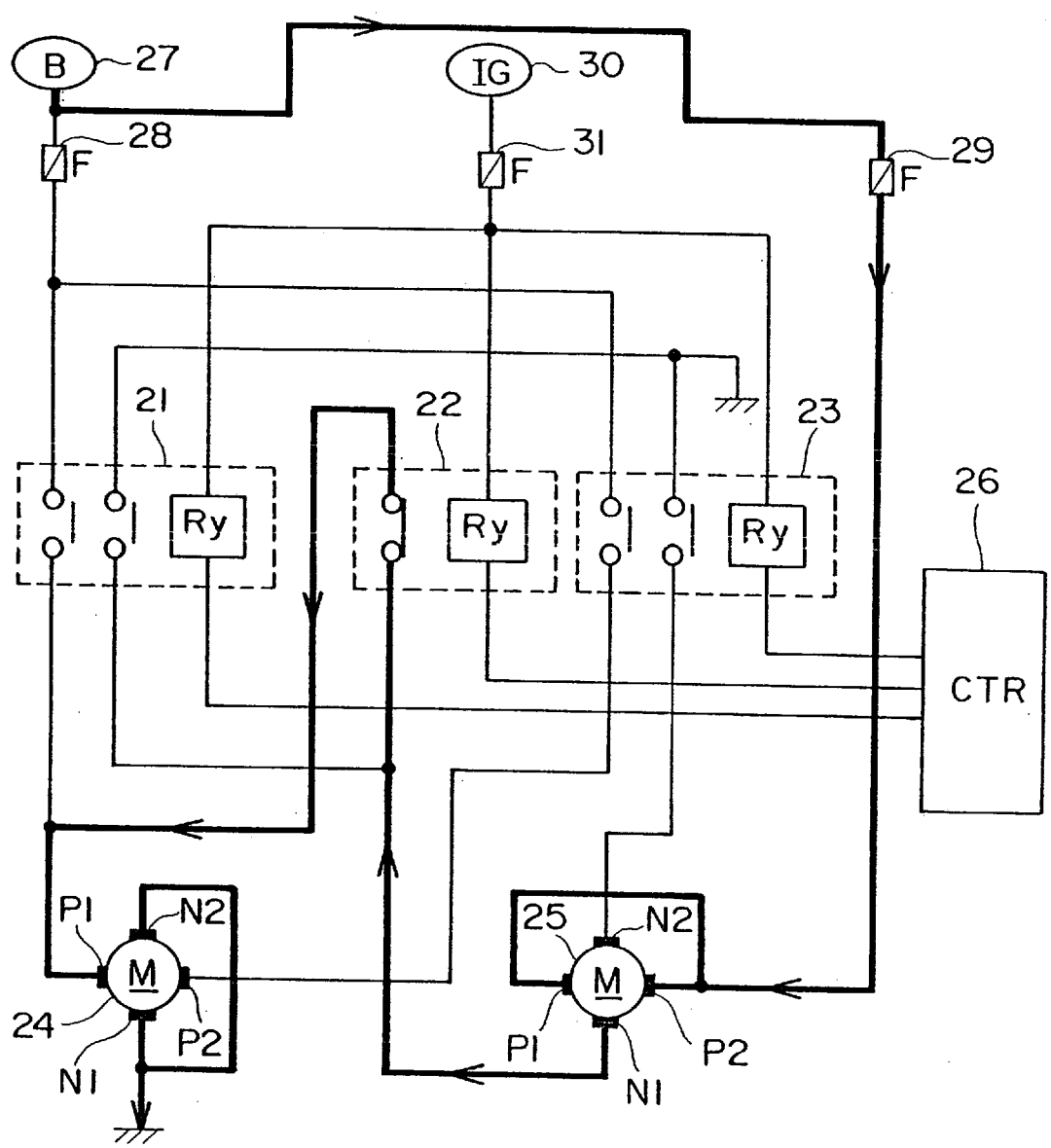
FIG. 7 is a drawing showing current flow at the time of low speed operation, for the motor fan control apparatus shown in FIG. 6.

At the time of low speed operation, as shown in FIG. 7, turning only the relay 22 ON by the controller 26 causes the motors 24 and 25 to be connected in series with four poles. Specifically, the battery power source 27 is normally connected to the terminals P1 as P2 of the motor 25. The terminal N1 of the motor 25 is connected to the terminals P1 of the motor 24 via the relay 22. The terminals N1 and N2 of the motor 24 are normally grounded to the vehicle body, and thus connected to the negative electrode of the battery power source 27. With this circuitry connection, as shown in FIG. 7, the motors 24 and 25 are connected in series with three poles, and current flows from the battery power source 27 to the motor 24 and the motor 25 in series. FIG. 7 indicates current flow with bold line.

Intermediate Speed Operation

Figure 8:
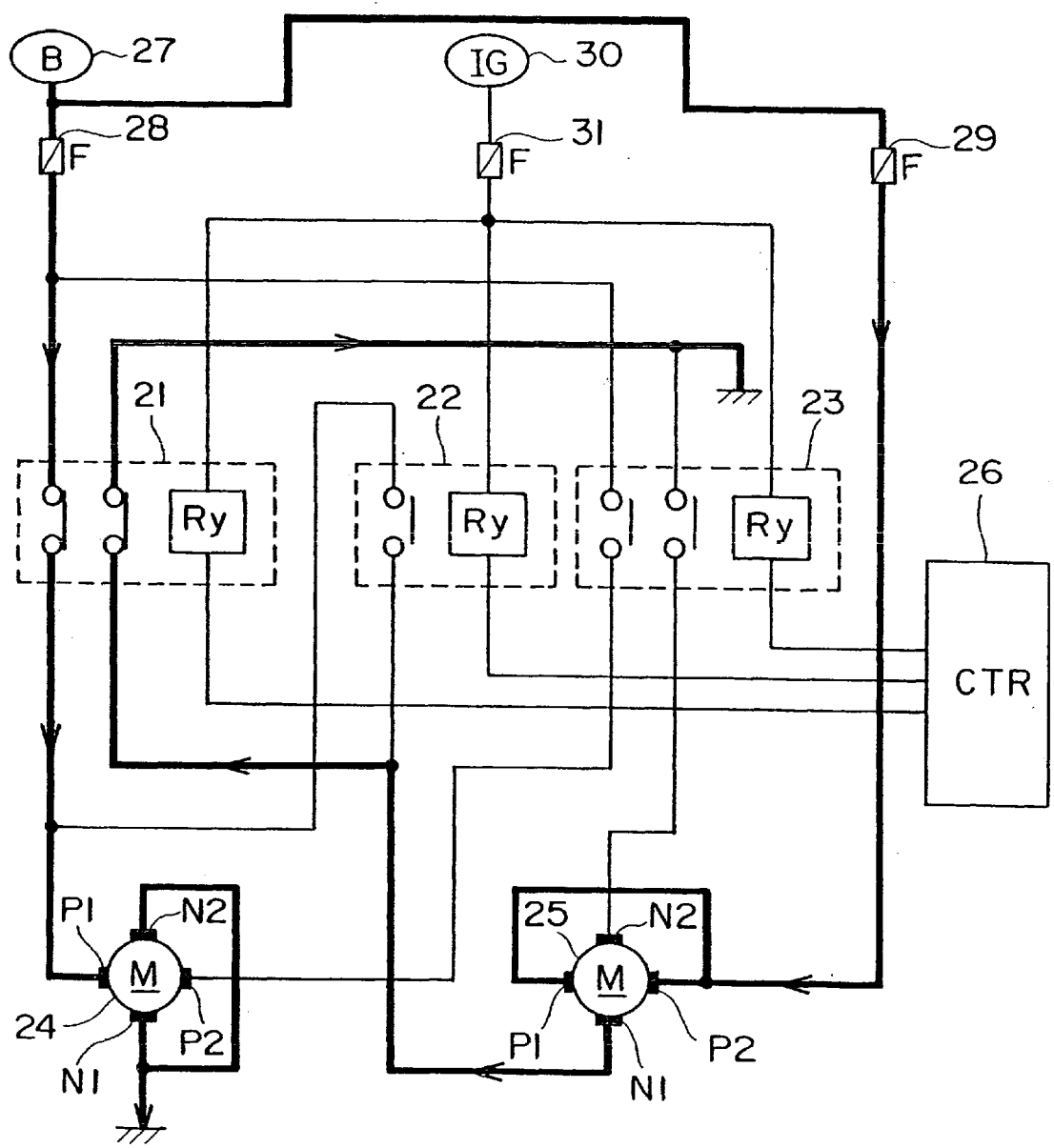
FIG. 8 is a drawing showing current flow at the time of medium speed operation, for the motor fan control apparatus shown in FIG. 6.

FIG. 8 shows a motor fan control circuit at the time of intermediate speed operation. In FIG. 8, as a result of the controller 26 turning on only the relay 21, the battery power source 27 is connected to the terminal P1 of the motor 24 and the terminal N1 of the motor 25 is connected to the negative electrodes of the battery power sources 27 via the vehicle body. The terminals P1 and P2 of the motor 25 are normally connected to the battery 27 and the terminals N1 and N2 of the motor 24 are normally connected to the negative electrodes of the battery power sources 27 through the vehicle body. Accordingly, the motors 24 and 25 are connected with three poles in parallel, so that current flows from the battery 27 to the motors 24 and 25 in parallel. FIG. 8 indicates current flow with bold line.

High Speed Operation

Figure 9:
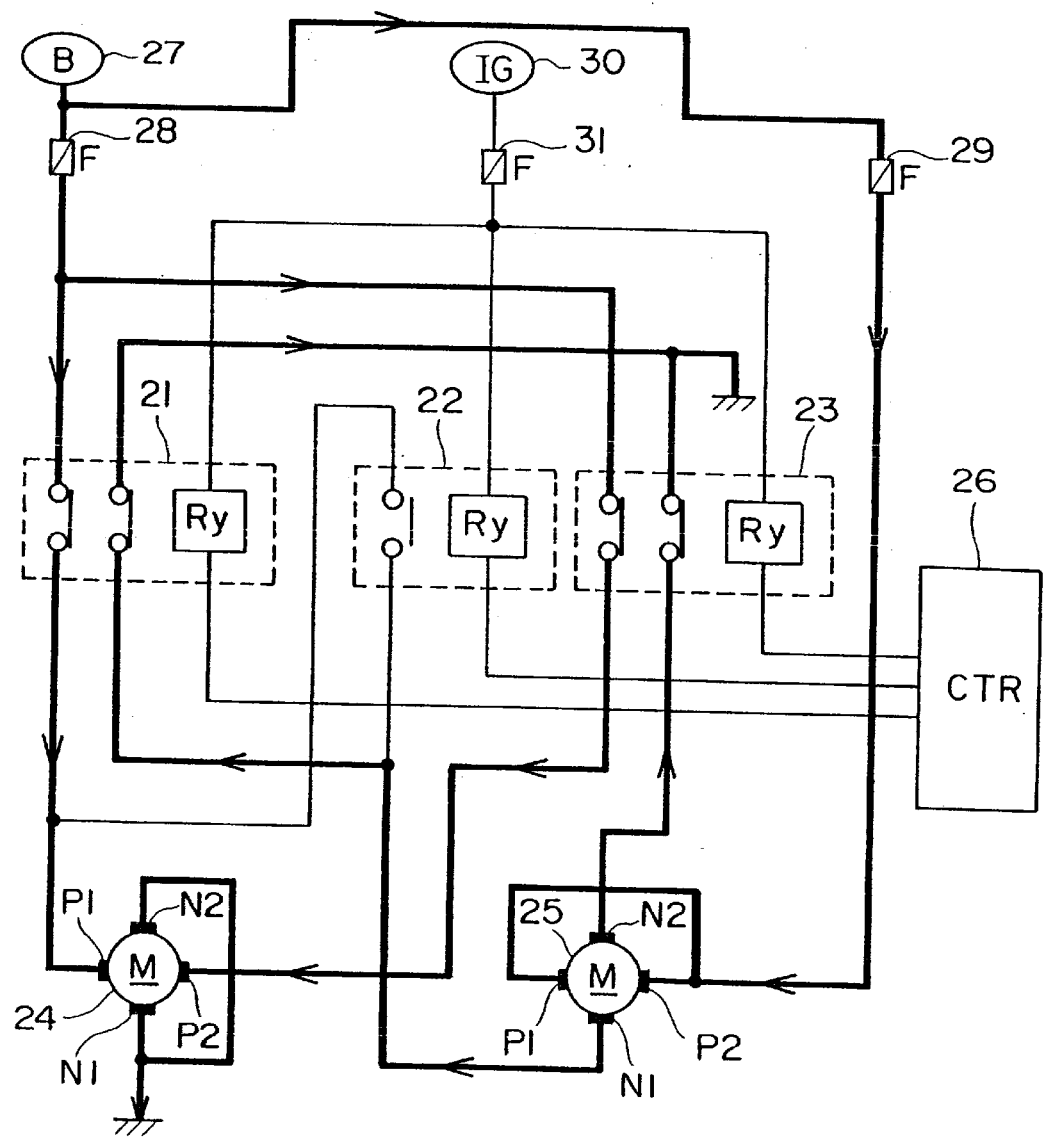
FIG. 9 is a drawing showing current flow at the time of high speed operation, for the motor fan control apparatus shown in FIG. 6.

At the time of high speed operation, as shown in FIG. 9, as a result of the controller 26 turning on the relays 21 and 23, the motors 24 and 25 are connected with four poles in parallel. Namely, the battery power sources 27 is connected to the terminals P1 and P2 of the motor 24 and the terminals N1 and N2 of the motor 25 are connected to the negative electrode of the battery power source 27 through the vehicle body. On the other hand, the terminals P1 and P2 of the motor 25 are normally connected to the battery power source 27 and the terminals N1 and N2 of the motor 24 are normally connected to the negative electrode of the battery power source 27 through the vehicle body. Therefore, the motors 24 and 25 are both driven in parallel with four poles so that current flows from the battery 27 to the motor 24 and 25 in parallel as shown FIG. 9 indicating current flow with bold line.

A motor fan control apparatus according to the second embodiment of the present invention, in which electrical power is supplied from a single battery source 27 to two 4-pole direct current motors 24 and 25, and two fans are respectively driven by the two motors 24 and 25, has the following structure to carry out individual three types of rotational speed control. One motor 25 has two + side armature winding terminals P1 and P2 connected together and two − side armature winding terminals N1 and N2 of the other motor 24 are connected together. The rotational speed of the two motors is controlled in three stages in conformance with switching between the series connected state and the parallel connected state of the two motors 24 and 25 as well as switching the number of drive poles of the two motors 24 and 25. More specifically, at the time of low speed operation, the two motors 24 and 25 are connected in series with three poles, at the time of intermediate speed mode, the two motors 24 and 25 are connected in parallel with three poles. At the time of high speed operation, the two motors 24 and 25 are connected in parallel with four poles.

The motor fan control apparatus according to the second embodiment can implements Low/Intermediate/High speed control with a smaller number of relays, and the cost of the apparatus can be suppressed. Also, two pole drive is used less frequently and the overall operating efficiency of the motor is improved. As well as being able to reduce the power consumption, it is possible to prolong the useful life of the brushes. High speed operation is used less frequently, and it is possible to reduce the overall amount of fan noise. These advantages are based on the same reasons as those of the first embodiment.

In the first and second embodiments according to the present invention, serial connection in which two motors are connected in series and parallel connection in which two motors are connected in parallel are switched. Also, a four pole connection state where the number of drive poles of two motors is made four and a three pole connection state where the number of drive poles of two motors is made three are switched. These switches enable rotational speed control in multiple stages.

Accordingly, as long as a control apparatus has the above noted distinctive function, the present invention is not limited to the first and second embodiments.

Third Embodiment

The motor fan control apparatus according to the first and second embodiments comprises 4-pole direct current motors. However, the present invention can be also applied to a motor fan control apparatus having 3-pole direct current motors. Namely, electric power is applied to two 3-pole direct current motors from the single power source to drive two fans of cooling system.

Figure 10:
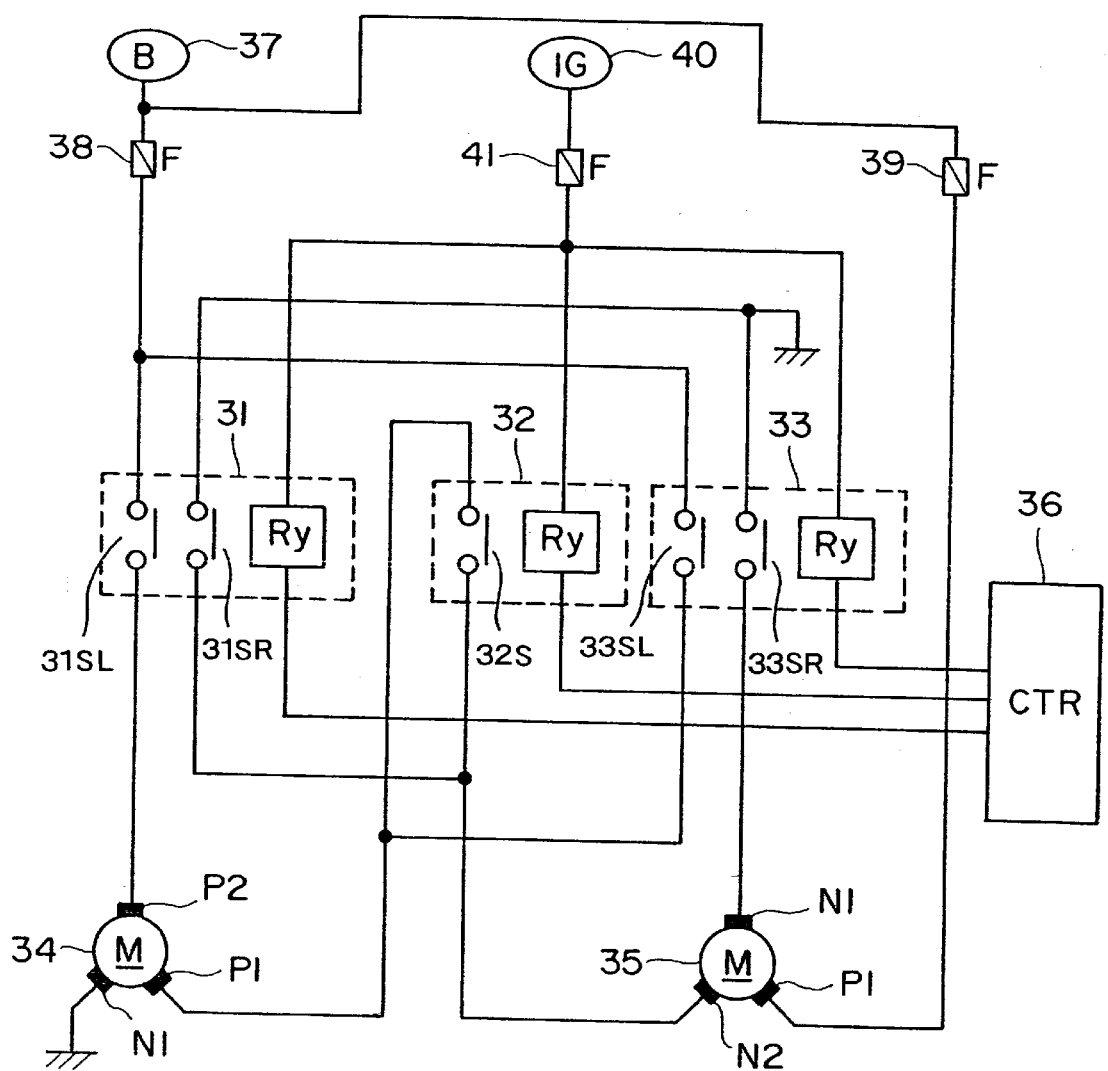
FIG. 10 is a drawing showing the third embodiment of a motor fan control apparatus according to the present invention.

FIG. 10 is a drawing showing the third embodiment of a motor fan control apparatus according to the present invention. With this motor fan control apparatus, a radiator and a condenser are cooled by cooling air generated from fans that are respectively driven two 3-pole direct current motors. In the motor fan control apparatus according to the third embodiment, rotational speed is controlled in low speed operation, medium speed operation and high speed operation. In order to carry out these rotational speed controls, the three relays 31–33 are operated so that the number of drive poles of the two 3-pole motors 34 and 35 is switched between three poles and two poles and serial and parallel connections are changed. It is to be noted that FIG. 10 shows all of the relays 31–33 in the OFF state.

In FIG. 10, the 3-pole direct motors 34 is provided with two armature winding terminals (hereafter simply called terminals) P1 and P2 connecting to positive pole brushes and one armature winding terminal (hereafter simply called terminals) N1 connecting to negative pole brush. The 3-pole direct motors 35 is provided with one armature winding terminal (hereafter simply called terminals) P1 connecting to positive pole brush, and two armature winding terminals (hereafter simply called terminals) N1 and N2 connecting to negative pole brushes.

The relays 31 and 33 have two a-contacts 31SL,SR and 33SL,SR and the relay 32 has one a-contact 32S. The controller 36 turns the relays 31–33 ON and OFF to switch the number of drive poles of the motors 34 and 35 and switch between the serial connection and parallel connection of the motors 34 and 35. Voltage is supplied from a battery (B) 37 through fuses 38 and 39 and the contacts of the relays 31–33 to the motors 34 and 35. Power is supplied from an ignition power source (IG) 35 through a fuse 41 to the coils of the relays 31–33. The ignition power source 35 is a power source which is effective as long as an ignition switch (not shown) is set at an ON or START position.

A description will now be given of the motor fan control apparatus according to the third embodiment referring to FIG. 11 for low speed operation, FIG. 12 for intermediate speed operation, and FIG. 13 for high speed operation.

Low Speed Operation

Figure 11:
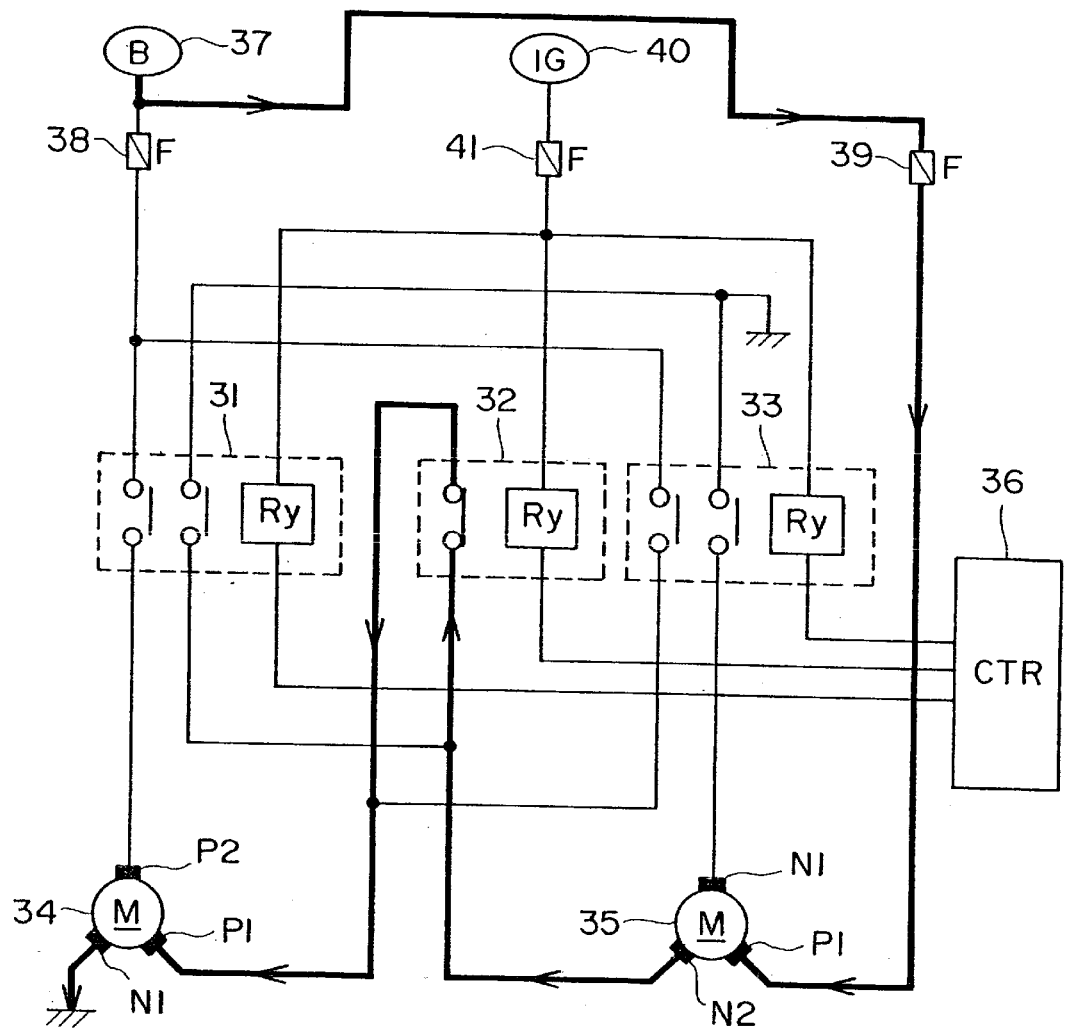
FIG. 11 is a drawing showing current flow at the time of low speed operation, for the motor fan control apparatus shown in FIG. 10.

At the time of low speed operation, as shown in FIG. 11, turning only the relay 32 ON by the controller 36 causes the motors 34 and 35 to be connected in series with two poles. Specifically, the terminal N2 of the motor 35 is connected to the terminal P1 of the motor 34. The battery power source 37 is normally connected to the terminal PI of the motor 35. The terminals N1 of the motor 34 is normally connected to the negative electrode of the battery power source 37 through the vehicle body. Therefore, the motors 34 and 35 are connected in series with two poles so that current flows from the battery 37 to the motor 34 via motor 35 in series as shown FIG. 11 indicating current flow with bold line.

Intermediate Speed Operation

Figure 12:
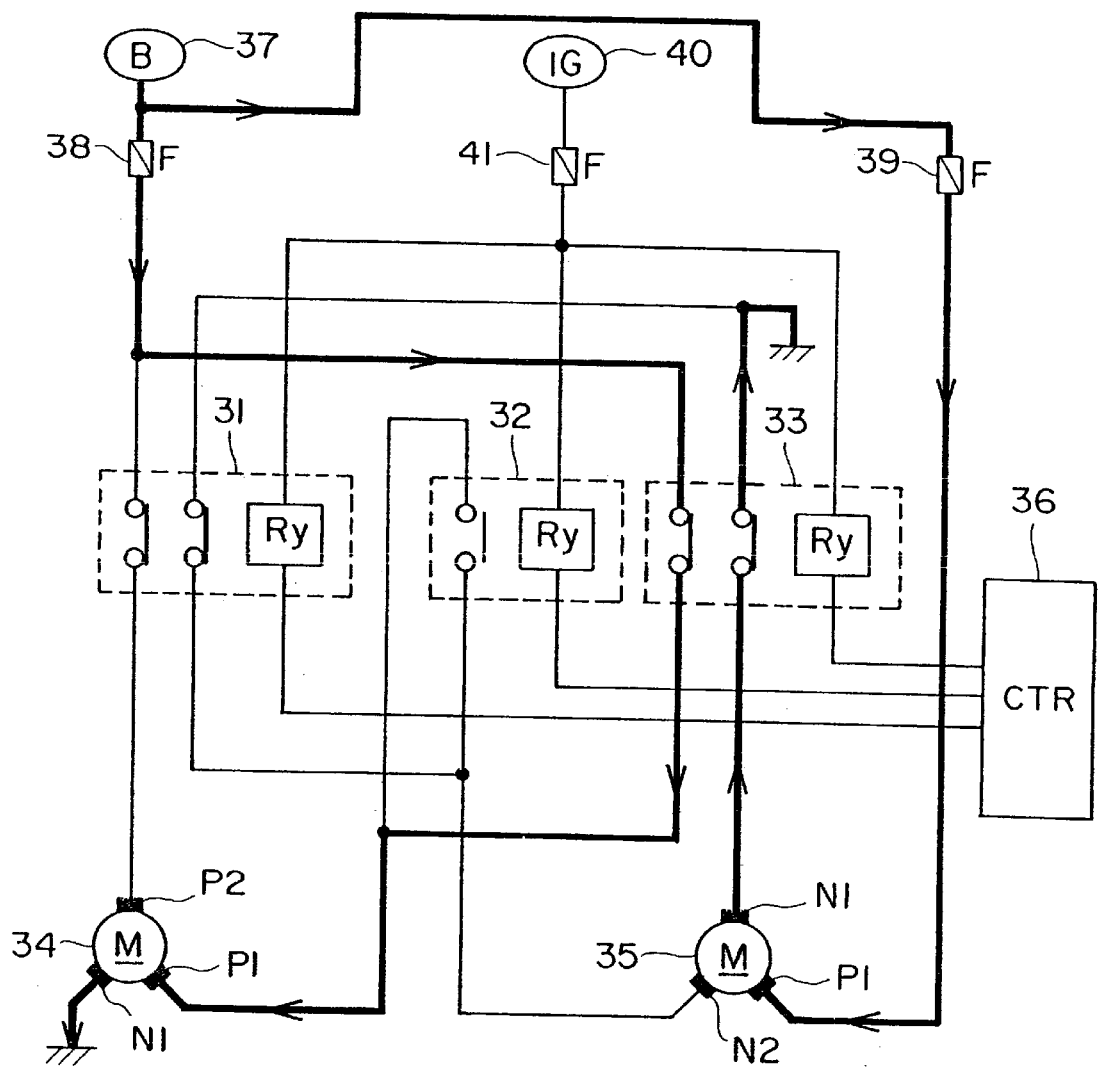
FIG. 12 is a drawing showing current flow at the time of medium speed operation, for the motor fan control apparatus shown in FIG. 10.

At the time of intermediate speed operation, as shown in FIG. 12, as a result of the controller 36 turning on only the relay 33, the battery power source 37 is connected to the terminal P1 of the motor 34 and the terminal N1 of the motor 35 is connected to the negative electrodes of the battery power sources 37 through the vehicle body. The terminal PI of the motor 35 is normally connected to the battery 37 and the terminal N1 of the motor 34 is normally connected to the negative electrodes of the battery power sources 37 through the vehicle body. Accordingly, the motors 34 and 35 are connected with two poles in parallel, so that current flows from the battery 37 to the motors 34 and 35 in parallel as shown FIG. 12 indicating current flow with bold line.

High Speed Operation

Figure 13:
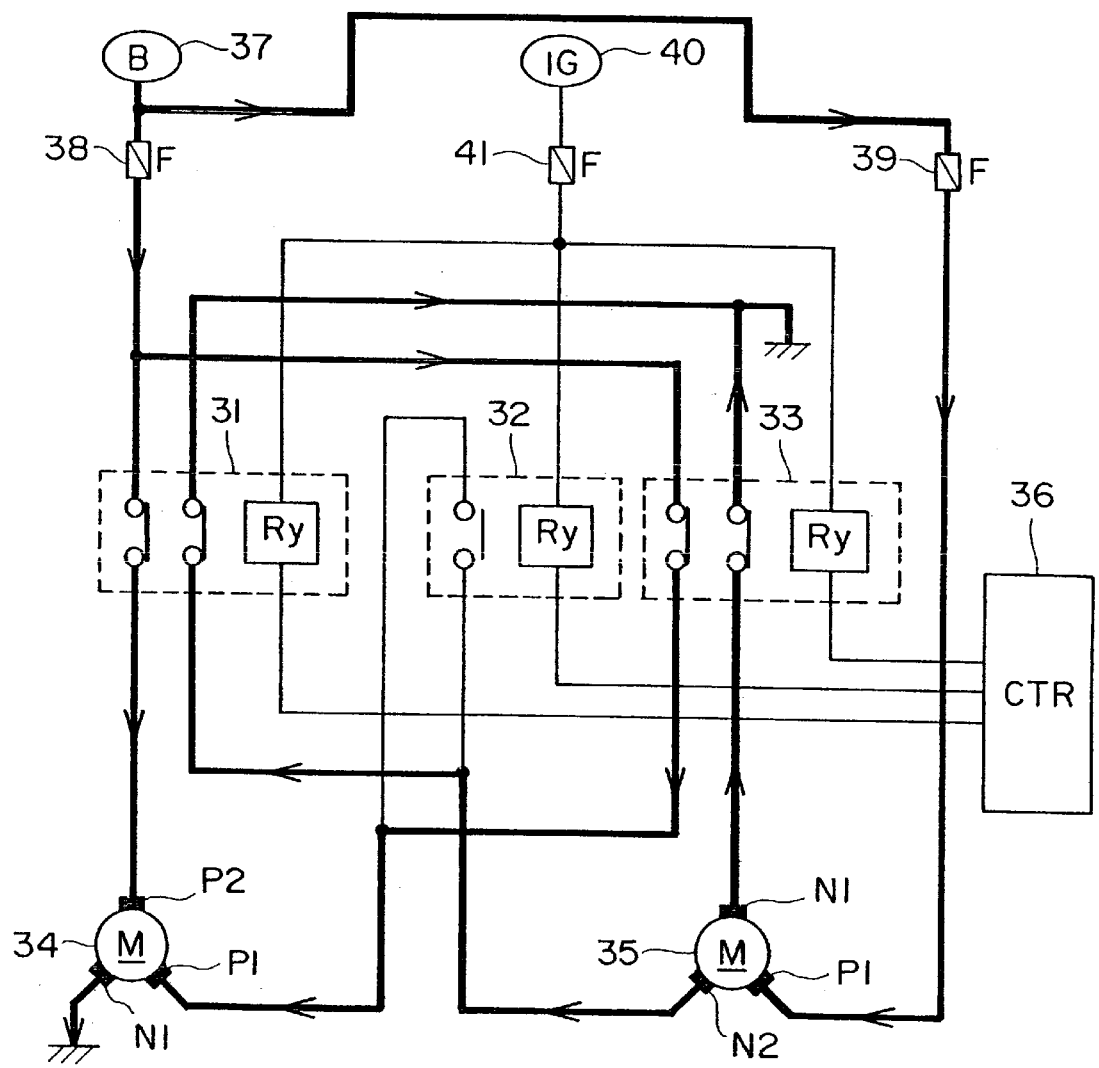
FIG. 13 is a drawing showing current flow at the time of high speed operation, for the motor fan control apparatus shown in FIG. 10.

At the time of high speed operation, as shown in FIG. 13, as a result of the controller 36 turning on the relays 31 and 33, the motors 34 and 35 are connected with three poles in parallel. Namely, the battery power sources 37 is connected to the terminals P1 and P2 of the motor 34, and the terminal N1 and N2 of the motor 35 are connected to the negative electrode of the battery power source 37 through the vehicle body. On the other hand, the terminal P1 of the motor 35 is normally connected to the battery 37 and the terminal N1 of the motor 34 is normally connected to the negative electrode of the battery power source 37 through the vehicle body. Therefore, the motors 34 and 35 are connected in parallel with three poles so that current flows from the battery 37 to the motors 34 and 35 in parallel as shown FIG. 13 indicating current flow with bold line.

A motor fan control apparatus according to the third embodiment of the present invention, in which electrical power is supplied from a single battery source 37 to two 3-pole direct current motors 34 and 35 and two fans are respectively driven by the two motors 34 and 35, has the following structure to carry out individual Low/Medium/High rotational speed controls. The rotational speed of the two motors is controlled in three stages in conformance with switching between the series and parallel connections of the two motors 34 and 35 as well as switching the number of drive poles of the two motors 34 and 35. More specifically, at the time of low speed operation, the two motors 34 and 35 are connected in series with two poles, at the time of intermediate speed mode, the two motors 34 and 35 are connected in parallel with two poles. At the time of high speed operation, the two motors 34 and 35 are connected in parallel with three poles.

The motor fan control apparatus according to the third embodiment can implements Low/Intermediate/High speed control with a smaller number of relays, and the cost of the apparatus can be suppressed. High speed operation is used less frequently and it is possible to reduce the overall amount of fan noise. These advantages are based on the same reason as those of the first embodiment.

With the above described these embodiments, description has been given for an example of a motor fan for cooling a radiator and a condenser. However, the present invention can obviously also be applied to a motor fan for cooling only the radiator or only a condenser, and there is no particular limitation on a cooling medium. Accordingly, the present invention can also be applied to a motor fan for blasting air at an object other than a heat exchanger. The present invention is also not limited to a vehicle driven by an engine, and can also be applied to an electric vehicle or a hybrid electric vehicle. In addition, the present invention is also not limited to a 4-pole or 3-pole direct current motor and therefore, an N-pole direct current motor is acceptable.

Incorporation by Reference

The disclosures of the following priority applications are herein incorporated by reference:

Japanese Patent Application No. 2001-1815 filed Jan. 9, 2001.

Japanese Patent Application No. 2001-347649 filed Nov. 13, 2001.

What is claimed is:

1. A control apparatus for two N-pole direct current motors receiving power from a single power source, for respectively driving two motor fans, comprising:
    a switching device that switches between a motor serial connection state where the two motors are connected in series and a motor parallel connection state where the two motors are connected in parallel, and switches a number of drive poles of the two motors, and
    a controller that controls said switching device so that rotational speed of the two motors is controlled in multiple stages by switching the number of drive poles of the two motors and switches the serial or parallel connection states of the two motors.

2. A motor fan control apparatus according to claim 1, wherein:
    the N-pole direct current motors are 4-pole direct current motors.

3. A control apparatus according to claim 2, wherein: said switching device switches between a motor serial connection state where the motors are connected in series and a motor parallel connection state where the motors are connected in parallel, and switches between a four pole connected state where a number of drive poles of the motors is four and a three pole connected state where a number of drive poles of the two moters is three.

4. A motor fan control apparatus according to claim 3, wherein:
    two + side armature winding terminals of one of the two motors are electrically connected together, and two − side armature winding terminals of the other motor are electrically connected together.

5. A motor control apparatus according to claim 4, wherein:
    said controller controls said switching device so that at the time of low speed operation the two motors are connected in series with four poles, at the time of intermediate speed operation the two motors are connected in parallel with three poles, and at the time of high speed operation the two motors are connected in parallel with four poles.

6. A motor control apparatus according to claim 5, wherein:
    said switching device is comprised of three relays, and the number of drive poles and serial or parallel connection of the two motors are changed by switching said three relays.

7. A motor control apparatus according to claim 6, wherein:
    the motor fan generates cooling air for a radiator and/or a condenser.

8. A motor fan control apparatus according to claim 1, wherein:
    the N-pole direct current motors are 3-pole direct current motors.

9. A control apparatus according to claim 8 wherein:
    said switching devise switches between a motor serial connection state where the two motors are connected in series and a motor parallel connection state where the two motors are connected in parallel, and switches between a three pole connected state where a number of drive poles of the two motors is three and a two pole connected state where a number of drive poles of the two motors is two.

10. A motor control apparatus according to claim 9, wherein:
    said controller controls said switching devices so that at the time of low speed operation the two motors are connected in series with two poles, at the time of intermediate speed operation the two motors are connected in parallel with two poles, and at the time of high speed operation the two motor are connected in parallel with thee poles.

11. A motor control apparatus according to claim 10, wherein:
    said switching device is comprised of three relays, and the number of drive poles and serial or parallel connection of the two motors are changed by switching said three relays.

12. A motor control apparatus according to claim 11, wherein:
    said motor fan generates cooling air for a radiator and/or a condenser.

13. A control apparatus for two N-pole direct current motors receiving power from a single power source, for respectively driving two motor fans, comprising:
    a switching means for switching between a motor serial connection state where the two motors are connected in series and a motor parallel connection state where the two motors are connected in parallel, and switching a number of drive poles of the two motors; and
    a control means for controlling said switching means so that rotational speed of the two motors is controlled in multiple stages by switching the number of drive poles of the two motors and switching the serial or parallel connection states of the two motors.

14. A control apparatus for two 4-pole direct current motors receiving power from a single power source, for respectively driving two motor fans for blasting air to heat exchanger for a vehicle, wherein
    two + side armature winding terminals of one of the two motors are electrically connected together, two − side armature winding terminals of the other motor are electrically connected together, one − side armature winding terminal of the one motor is normally grounded and one + side armature winding terminal of the other motor is normally connected to the single power source, and said control apparatus comprises;
    a first switching device interposed between the single power source and the two + side armature winding terminals of the one motor,
    a second switching device interposed between the single power source and the one + side armature winding terminal of the other motor,
    a third switching device interposed between the two + side armature winding terminals of the one motor and the two − side armature winding terminals of the other motor,
    a fourth switching device interposed between electrical ground and the one − side armature winding terminal of the one motor,
    a fifth switching device interposed between electrical ground and the two − side armature winding terminals of the other motor, and
    a controller that controls said first to fifth switching devices so that rotational speed of the two motors is controlled in multiple stages by switching the number of drive poles of the two motors and switching the serial or parallel connection state of the two motors.

15. A motor control apparatus according to claim 14, wherein:

said controller controls said first to fifth switching devices so that at the time of low speed operation the two motors are connected in series with four poles, at the time of intermediate speed operation the two motors are connected in parallel with three poles, and at the time of high speed operation the two motors are connected in parallel with four poles.

16. A motor control apparatus according to claim 15, wherein:

said first to fifth switching devices are comprised of three relays, and the number of drive poles and serial or parallel connection of the two motors are changed by switching said three relays.

17. A motor control apparatus according to claim 16, wherein:

the heat exchanger is a radiator and/or a condenser.

18. A control apparatus for two 4-pole direct current motors receiving power from a single power source, for respectively driving two motor fans for blasting air to heat exchanger for a vehicle, wherein two + side armature winding terminals of one motor of the motors are electrically connected together and normally connected to the single power source, and two − side armature winding terminals of the other motor are electrically connected together and normally grounded, and said control apparatus comprises;

a first switching device interposed between the single power source and the two + side armature winding terminals of the one motor of the two motors, a second switching device interposed between one + side armature winding terminal of the one motor and one − side armature winding terminal of the other motor, a third switching device interposed between electrical ground and two − side armature winding terminals of the one motor, and a controller that controls said first to third switching devices so that rotational speed of the two motors is controlled in multiple stages by switching the number of drive poles of the two motors and switching the serial or parallel connection state of the two motors.

19. A motor control apparatus according to claim 18, wherein:

said controller controls said first to third switching devices so that at the time of low speed operation the two motors are connected in series with three poles, at the time of intermediate speed operation the two motors are connected in parallel with three poles, and at the time of high speed operation the two motors are connected in parallel with four poles.

20. A motor control apparatus according to claim 19, wherein:

said first to third switching devices are comprised of three relays, and the number of drive poles and serial or parallel connection of the two motors are changed by switching said three relays.

21. A motor control apparatus according to claim 20, wherein:

the heat exchanger is a radiator and/or a condenser.

22. A control apparatus for two 3-pole direct current motors receiving power from a single power source, for respectively driving two motor fans, wherein + side armature winding terminal of the one motor of the two motors is normally connected to the single power source, and − side armature winding terminal of the other motor is normally grounded, and wherein:

said control apparatus comprises a first switching device interposed between the single power source and the two + side armature winding terminals of the other motor of the two motors, a second switching device interposed between the one + side armature winding terminal of the other motor and the one − side armature winding terminal of the one motor, a third switching device interposed between electrical ground and the two − side armature winding terminals of the one motor, and a controller that controls said first to third switching devise so that rotational speed of the two motors is controlled in multiple stages by switching the number of drive poles of the two motors and switching the serial or parallel connection states of the two motors.

* * * * *